AUTOMATIC CONTROL FOR HYDRAULIC MECHANISM
Filed Nov. 4, 1968
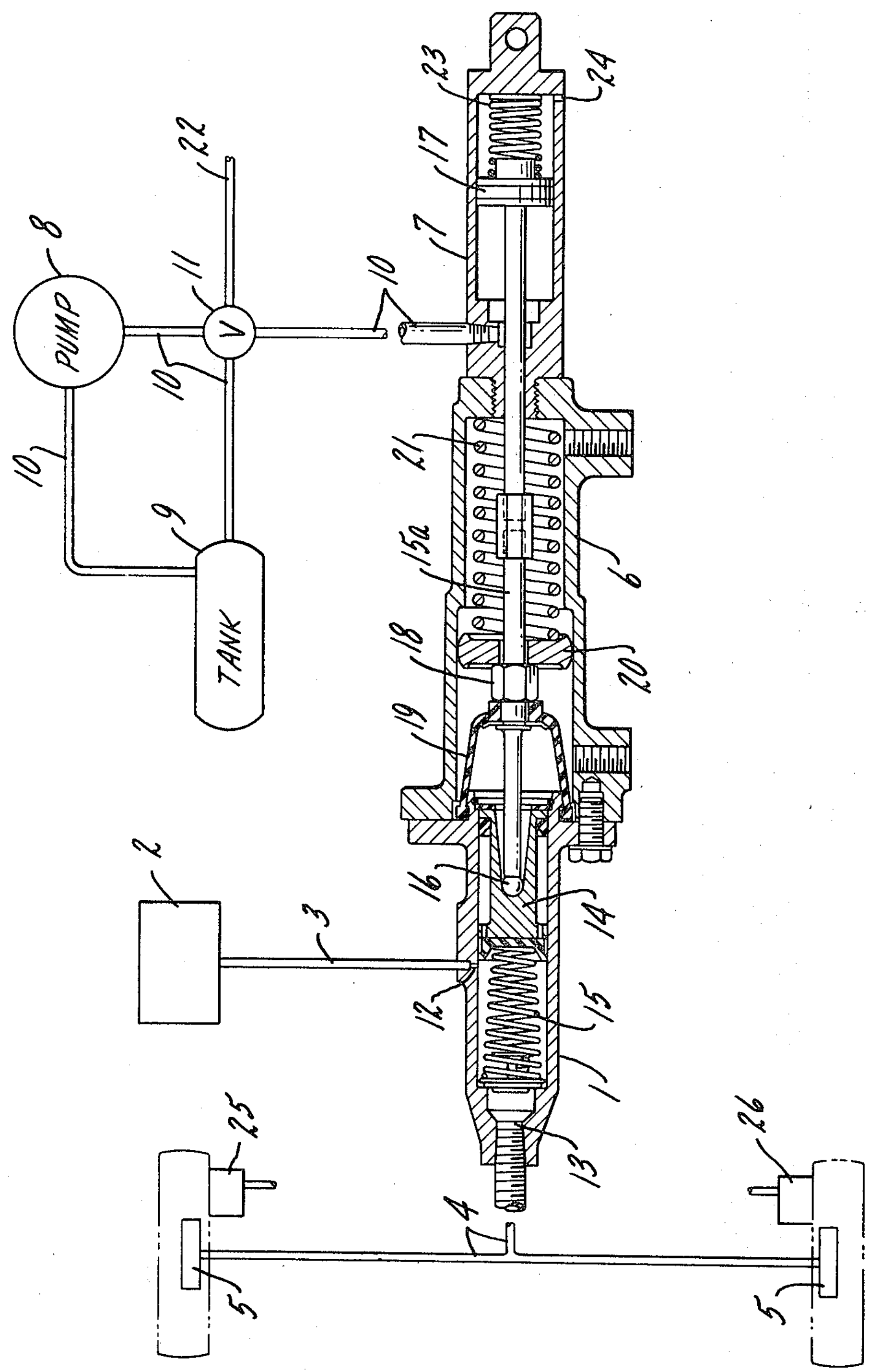
INVENTORS.
WILLIAM T. SALAM
CHARLES G. MIDDLETON
BY Parker, Carter & Markey
Attorneys.

United States Patent Office 3,538,708

Patented Nov. 10, 1970

3,538,708
AUTOMATIC CONTROL FOR HYDRAULIC MECHANISM

William T. Salam, Highland Park, and Charles G. Middleton, Addison, Ill., assignors to Stromberg Hydraulic Brake and Coupling Company, Chicago, Ill., a corporation of Illinois Filed Nov. 4, 1968, Ser. No. 773,054
Int. Cl. F15b *7/08;* F16d *65/14*
U.S. Cl. 60—54.5 2 Claims

ABSTRACT OF THE DISCLOSURE

An operator-actuated hydraulic master cylinder, a power cylinder, a hydraulic connection between them, a selector in series with the hydraulic connection permitting, when in one position, free hydraulic flow between the cylinders and, when in another position, interrupting the connection to the master cylinder and separately applying pressure to the power cylinder, means for biasing the selector into disconnect position and means, including a source of hydraulic power independent of the master cylinder, for overcoming the bias to hold the selector in free flow position together with means for rendering the source of hydraulic power ineffective to permit the bias to move the selector into disconnect position.

SUMMARY OF THE INVENTION

This invention may well be used in an automotive vehicle. Such a vehicle may have the usual brake system including a master cylinder, power or brake cylinder, a connection between them and a separate source of hydraulic power. The source of hydraulic power may be the vehicle engine or any other suitable source independent of the brake system.

A selector in series with the brake system provides, in one position, free hydraulic flow between the cylinders and, in another position, interrupts the flow of power from the master cylinder and independently supplies hydraulic pressure to the power cylinder. The selector is normally biased toward its pressure-applying position. The pressure from the separate hydraulic power source normally overcomes the bias and holds the selector in free flow position to enable the master cylinder to apply pressure to the power cylinder but when the bias is no longer overcome, flow from the master cylinder is cut off and the selector provides pressure to the power cylinder independent of the master cylinder.

The selector cylinder is ported for intake and discharge to communicate respectively with passages leading from the master cylinder and to the power cylinder. It contains a piston which, in the retracted or free flow position, leaves both ports open in the free flow position and, when moved from the retracted position, closes the intake port and by its movement applies pressure to the power cylinder through the discharge port. A piston rod connects the selector piston with a pull piston in line therewith in a selector control cylinder. A spring biases the selector piston away from the retracted position. Hydraulic fluid fed to the control piston overcomes the bias. When the hydraulic pressure is released, the bias spring moves the selector piston away from the retracted position to the discharge port closing and pressure-applying position, the control cylinder being vented on the low pressure side of the control piston.

BRIEF DESCRIPTION OF THE DRAWINGS

The invention is illustrated more or less diagramatically in the accompanying drawing wherein is disclosed a flow sheet with some of the structural elements in section and in elevation.

DESCRIPTION OF THE PREFERRED EMBODIMENTS

A selector cylinder is illustrated at 1 and the operator-actuated master cylinder at 2. A hydraulic duct 3 leads from the master cylinder 2 to the selector cylinder 1 and a duct 4 leads from the selector cylinder to the power cylinder 5 which may be on an automotive vehicle. The bias spring housing 6 is in line with the selector cylinder 1 and the selector control cylinder 7. A pump 8 and storage tank 9, independent of the master cylinder 2, are connected by ducts 10 through a valve 11 to the control cylinder 7.

The selector cylinder 1 has an intake port 12 to communicate through the duct 3 with the master cylinder 2 and an outlet port 13 to communicate with the duct 4 to the cylinder 5. The selector piston 14 is reciprocable in the cylinder 1 and, when in the retracted position as shown in the drawing, the ports 12 and 13 are unobstructed and free flow is permitted from master cylinder 2, duct 3, port 12, cylinder 1, port 13, duct 4 to the power cylinder 5 so that the operator control of cylinder 5 through master cylinder 2 is uninterrupted. A piston is thus in the retracted free flow position. The piston 14 is sealed in the usual manner and, when moved forward against the return spring 15, closes port 12 and applies pressure directly independent of the master cylinder to the power cylinder 5.

The piston rod **15*a* abuts at 16 on the low pressure side of the piston 14 and extends rearwardly through the housing, into the cylinder 7, to the control piston 17. The nut 18 on the piston rod abuts on the packing sleeve 19 on the side toward the piston 14. The collar 20 is held against the nut 18 by the bias spring 21 in the housing 6 so that the bias spring normally urges or biases the piston 14 toward the position to close the port 12 and applies pressure directly to the power cylinder 5**.

Pressure through the duct 10 to the high pressure side of the cylinder 7 urges the control piston toward the right away from the selector piston to overcome the bias and hold the selector piston in free flow position.

The valve 11 may be manually or automatically controlled as desired. The duct 22 leads from the valve 11 to any place where hydraulic pressure is needed. In the position shown, the valve 11 supplies the pressure to hold the piston 17 back against the bias pressure. When the valve 11 is manipulated, hydraulic pressure will be conducted through the duct 22, the duct 10 will be shut off, and the biasing spring 21 and the return control piston spring 23 will force the selector piston 14 into position to close the port 12 and apply pressure directly to the cylinder 5 independent of the master cylinder. The cylinder 7 on the low pressure side is vented as indicated at 24.

If on an automotive vehicle, the pump 8 may be actuated by the automotive engine or it may be actuated by other suitable power means.

It should be understood however that the system need not invariably be employed in an automotive having a conventional automotive engine, since it is quite within the scope of the invention to employ the illustrated system with vehicles powered by a hydraulic, or other type of drive. For example, the system may be designed to operate as an automatic brake lock. It could also be used as a safety brake lock in the event of pump failure on any type of machine in which an automatic or safety braking function is required. In many environments the system will act as a fail safe parking brake.

One such system can be visualized from the figure if it be assumed that the system is employed as an automatic brake lock for a hydraulically driven aircraft support vehicle used at airports to perform baggage, passenger, and food loading and unloading functions. Hydraulic drive means for the wheels are indicated at 25 and 26, it being understood that these are conventional and thus need no further illustration. As is well known, the driving and steering functions of the wheels are performed by increasing or decreasing the fluid flow to the wheel motors which are indicated diagrammatically at 25 and 26. When the vehicle stops and the operator turns off the ignition key, the motor or engine that powers pump 8 is stopped. Stoppage of pump 8 causes decay of the pressure in line 10 leading to auxiliary cylinder assembly 7, thus permitting the spring means 21 and 23 to move piston 14 to the left and pressurize outlet 13 and power cylinders 5. In this instance 2 would merely be a reservoir or source of pressure fluid which is gravity fed into the chamber in selector cylinder 1.

Alternately, of course, it is not necessary that the operator shut down the motor or engine which drives pump 8. He may merely actuate valve 11 to divert the pump output into line 22 to do other useful work such as operating an elevating mechanism. It will be understood however that the effect on cylinder 7 will be the same as if the pump were shut down. It should also be understood that the source of pressure fluid for actuating cylinder assembly 7 need not be a pump. Any suitable pressure source, such as an accumulator with suitable de-pressurizing means which are operable in response to a predetermined change of condition may be employed.

From the foregoing description of the invention it is apparent that modifications may be made by those having ordinary skill in the art. Accordingly, the scope of the invention should be defined, not by the terms of the foregoing description, but solely by the hereinafter appended claims when construed in light of the pertinent prior art.

We claim:

1. In combination in an auxiliary brake operating mechanism:
- a conduit between a source of hydraulic fluid and brake means,
- a first hydraulic chamber in said conduit having an inlet, an outlet and a piston therein,
- said piston being movable between a first position in which it is out of the fluid flow path between the inlet and the outlet, and a second position in which it interrupts the fluid flow path and the outlet pressure is established by pressure in the first hydraulic chamber downstream from the hydraulic piston,
- spring means biased to urge the hydraulic piston toward the second position, and
- means for maintaining the hydraulic piston in the first position, said means including:
  - a source of auxiliary hydraulic pressure,
  - an auxiliary hydraulic cylinder assembly,
  - a conduit between said source of auxiliary hydraulic pressure and said auxiliary hydraulic cylinder assembly,
  - a force transmitting connection between the piston in said auxiliary hydraulic cylinder assembly and the piston in said first hydraulic chamber,
  - the pressure generated by the source of auxiliary hydraulic pressure being sufficient to enable the piston in said first hydraulic chamber to be maintained in the first position against the bias of the spring means,
  - said spring means being effective to move the piston in the first hydraulic chamber into the second position when the pressure generated by the source of auxiliary hydraulic pressure falls below a predetermined magnitude.

2. In combination in a brake operating mechanism:
- a fluid conduit between a first pressure fluid source and brake means,
- a first fluid pressure chamber in said fluid conduit having an inlet, an outlet and a piston therein,
- said piston being movable between a first position in which it is out of the fluid flow path between the inlet and the outlet, and a second position in which the flow path is interrupted by the piston and the outlet pressure is established by the pressure in the first fluid pressure chamber generated by the piston,
- spring means biased to urge the piston toward the second position, and
- means for maintaining the piston in the first position, said means including:
  - a second fluid pressure source,
  - an auxiliary fluid pressure cylinder assembly,
  - a fluid conduit between said second fluid pressure source and said auxiliary fluid pressure cylinder assembly,
  - a force transmitting connection between the piston in said auxiliary fluid pressure cylinder assembly and the piston in said first fluid pressure chamber,
  - the pressure generated by the second fluid pressure source being sufficient to maintain the piston in said first fluid pressure chamber in the first position against the bias of the spring means,
  - said spring means being effected to move the piston in the first fluid pressure chamber into the second position when the pressure generated by the auxiliary fluid pressure cylinder assembly falls below a predetermined magnitude.

References Cited

UNITED STATES PATENTS

| | | | |
|---|---|---|---|
| 2,418,666 | 4/1947 | Rockwell | 188—170 XR |
| 2,423,204 | 7/1947 | Rockwell | 188—170 XR |
| 3,013,624 | 12/1961 | De Remer et al. | |
| 3,425,221 | 2/1969 | Canfield. | |

MARTIN P. SCHWADRON, Primary Examiner

R. BUNEVICH, Assistant Examiner

U.S. Cl. X.R.

60—54.6; 188—106, 170